Figure 1:
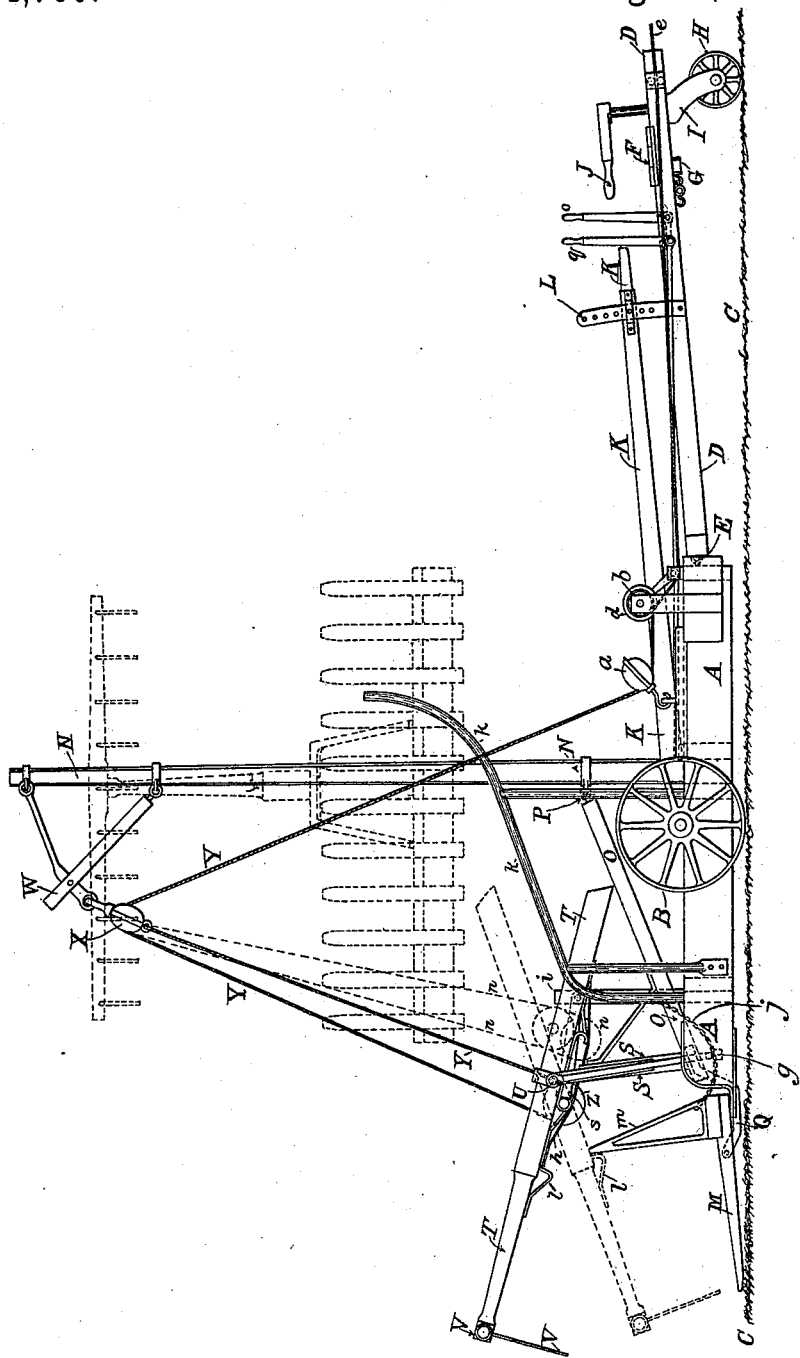
Figure 8:
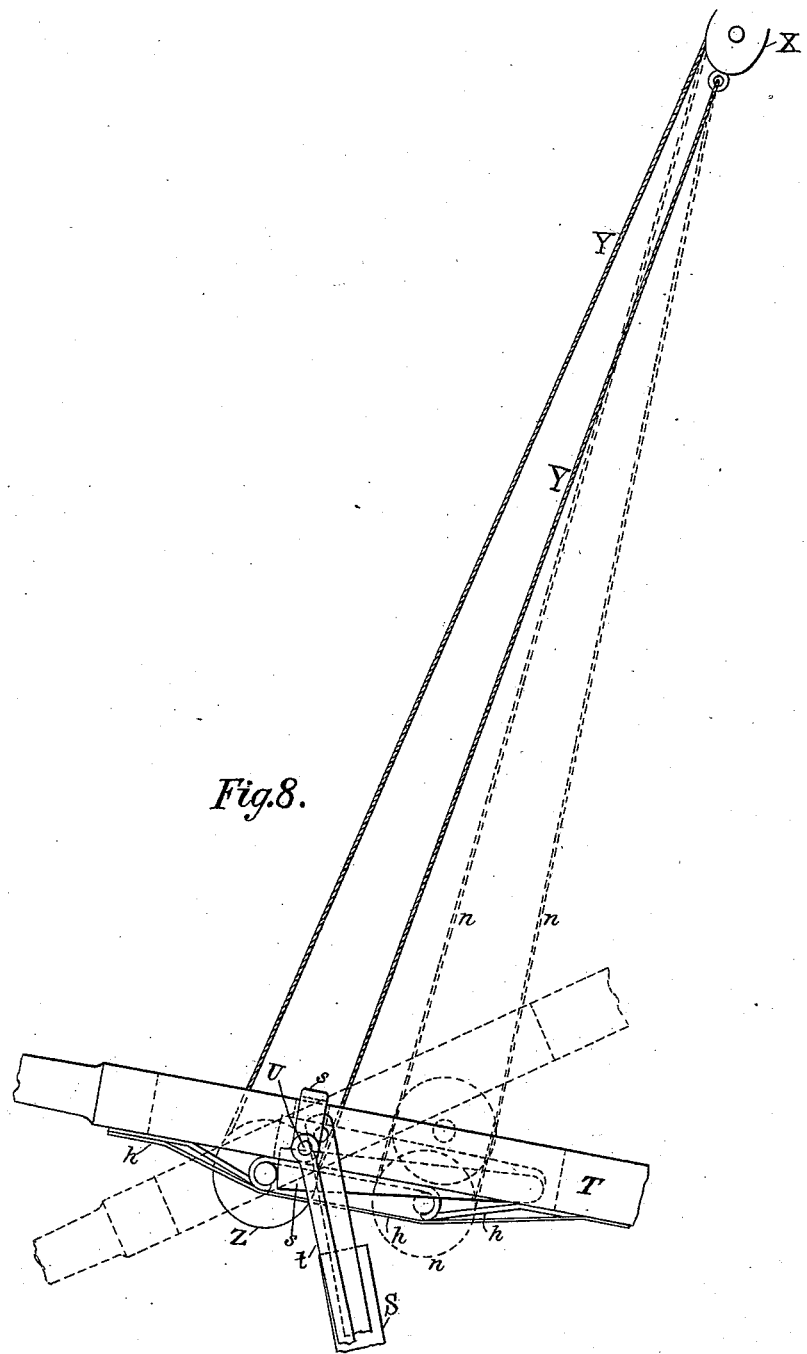

(No Model.) 5 Sheets—Sheet 1.

C. FREEMAN.
MACHINE FOR LIFTING AND LOADING HAY, GRAIN, &c.

No. 544,760. Patented Aug. 20, 1895.

WITNESSES:
J. Nelson Alexander
Francis J. Thomas

INVENTOR
Charles Freeman
BY S. L. Day.
ATTORNEY.

(No Model.) 5 Sheets—Sheet 2.
C. FREEMAN.
MACHINE FOR LIFTING AND LOADING HAY, GRAIN, &c.
No. 544,760. Patented Aug. 20, 1895.
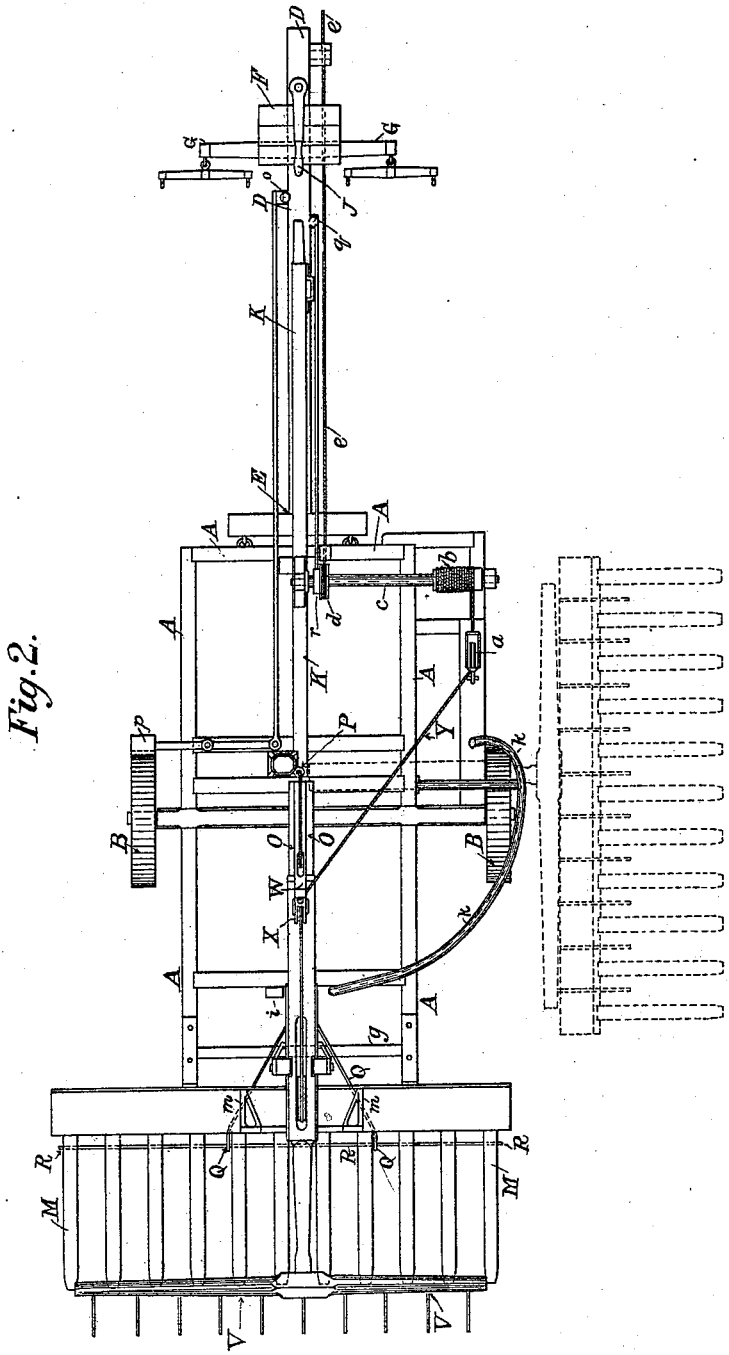
WITNESSES:
J. Nelson Alexander
Francis J. Thomas
INVENTOR
Charles Freeman
BY S. L. Day.
ATTORNEY.

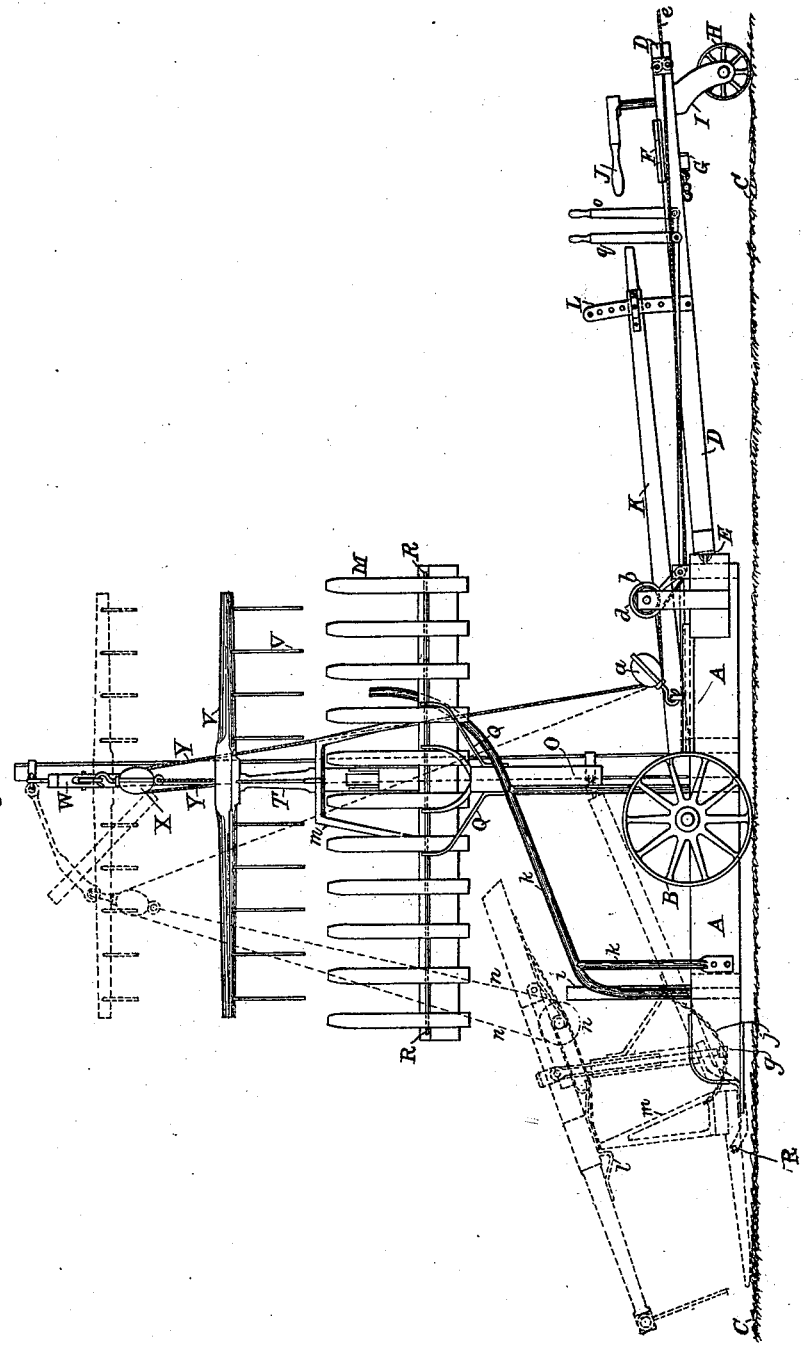

(No Model.) 5 Sheets—Sheet 4.
C FREEMAN.
MACHINE FOR LIFTING AND LOADING HAY, GRAIN, &c.
No. 544,760. Patented Aug. 20, 1895.
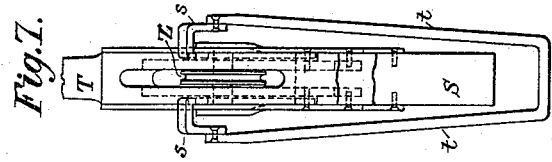
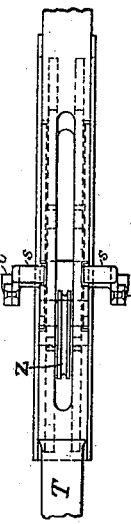
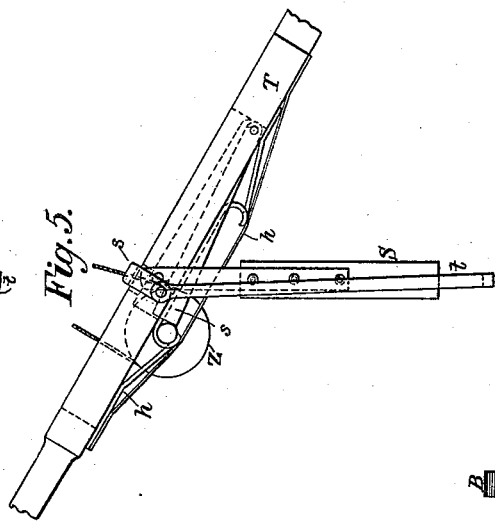
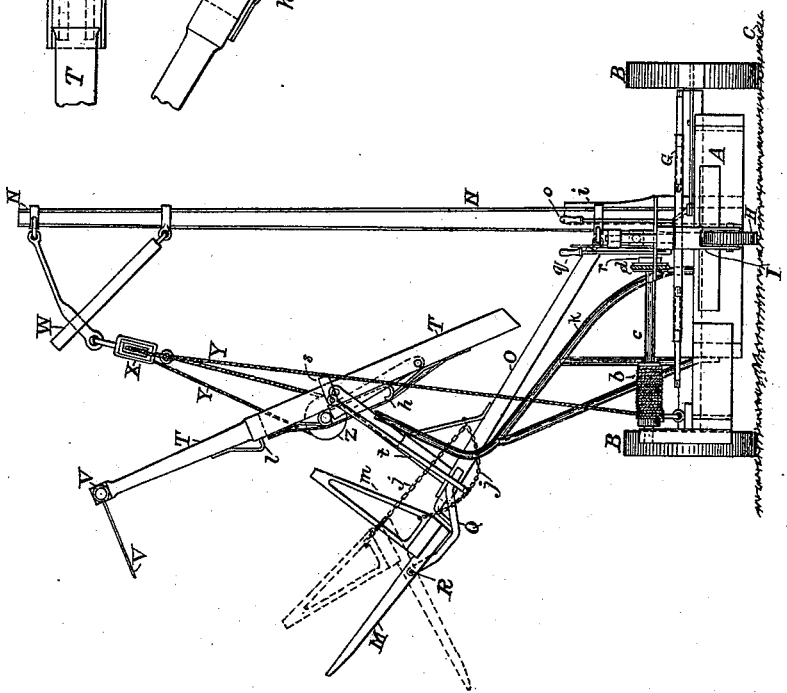
WITNESSES:
J. Nelson Alexander
Francis J. Thomas
INVENTOR
Charles Freeman
BY
S. L. Day.
ATTORNEY.

UNITED STATES PATENT OFFICE.

CHARLES FREEMAN, OF INGLEWOOD, CALIFORNIA.

MACHINE FOR LIFTING AND LOADING HAY, GRAIN, &c.

SPECIFICATION forming part of Letters Patent No. 544,760, dated August 20, 1895.

Application filed April 18, 1894. Serial No. 507,983. (No model.)

*To all whom it may concern:*

Be it known that I, CHARLES FREEMAN, of Inglewood, in the county of Los Angeles and State of California, have invented a certain new and useful Improvement in Machines for Lifting and Loading Hay, Grain, or other Crops, of which the following is a full, clear, and exact specification, reference being had to the annexed drawings, forming part of this specification, and to the letters marked thereon.

My invention has for its object and is specially designed for collecting and raising from the ground hay, grain, or other crops, and when raised to the requisite height above the ground for discharging or unloading, otherwise known as "dumping," the same into the carts or wagons, whereby the crop is carried to a rick, barn, thrashing-machine, or elsewhere.

The machine wherein my invention is comprised is operated by horses, a pair or span of which is employed for propelling the machine over the ground from off which the crops are to be gathered, while a third horse is used for operating the lifting and discharging or dumping parts of the mechanism.

The machine consists of a rectangular frame carried upon wheels, which support it and enable the horses to easily propel the machine over the ground from which the crop is to be gathered. To the rear part of this frame a tongue or pole is attached and projects more or less horizontally rearward. Toward the rearward end of this tongue or pole a small platform is fixed, upon which the driver of the horses whereby the machine is propelled is located. A handle or lever connected with a steering-wheel is also attached to the outer end of this tongue for enabling the driver to direct the course of the machine over the ground. The starting handle or lever is situated between the driver's legs when he stands upon the aforesaid platform, so that by swaying his body either to the right or left he moves the steering handle or lever correspondingly, thus controlling the direction of movement of the machine also. The tongue is also provided with a doubletree, to which the horses which propel the machine are harnessed, one horse on either side of the tongue. The front part of the machine carries a broad rake, which as the machine is being propelled passes under the loose crop lying upon the ground, and collects or gathers a load of the crop upon itself. A lever is pivoted on the main frame extending rearward to the driver, which on being raised or lowered slightly by the driver's hand varies or regulates the angular relationship of the rake and the ground from time to time, as may be required, the object of this variation being to lift or lower the position of the points of the teeth of the rake relatively with the ground. A brake-lever is also situated near the driver for applying a brake-block to one or both of the carrying-wheels when necessary, as hereinafter more fully explained. Near the middle of the main frame a mast is carried. To the lower part of this mast an arm is connected by a universal joint. This arm when in its lowest position inclines from the mast downward and toward the front end of the rectangular main frame, and at its outer end carries by suitable hinge connections the broad rake herein previously referred to. This arm also carries a post near its outer end, to the upper part of which a swinging lever is pivoted. The outer end of this swinging lever carries a fork with long teeth or prongs projecting downward toward the rake, and the fork itself is of about the same width as that of the rake. The inner end of this lever acts as a stop to control or limit the extent of movement of the said fork in one direction, as hereinafter described, while it also acts as a counterbalance to the said fork. This swinging lever is connected by means of rope-and-pulley tackle to a jib carried near the top of the mast and connected to the mast by a universal joint. The rope of this tackle, at its lowest part, passes under a rolling pulley carried in parallel guides extending some distance on both sides of the pivoting center of said lever. Automatically-acting stops are provided, which, during one part of the operation—that is to say, when the rake and fork are lowered from their highest to their lowest position—hold the roller-pulley at the outer end of said roller-guides, in which position the tension on the rope holds the front end of the lever with its fork upraised. So soon as the lowest position of the rake and fork is reached an attachment of the stops comes in contact with a bar carried in the main frame. This contact causes the said stops to be lifted above the axis of the roller-pulley, thus leaving the roller free to be moved along the roller-guides. The continued tension of the rope at the instant these stops are lifted starts the roller-pulley to move along the guides rearward to a position where the distance between the center of the roller-pulley and the center of the block on the jib is less than the distance between these centers, when the roller-pulley is in the position in which the stops hold it previous to their release. The effect of this movement of the roller-pulley to a position a little nearer the block carried on the jib is to slacken the tension of the rope, and the fork is held up from the rake by the counterweight of the inner end of the lever. When the rake has collected a load of the crop upon itself by being forced under the crop lying on the ground, the pulling of the third horse upon the rope-tackle causes the aforesaid lever carrying the fork to be turned upon its pivot, whereby the fork is moved downward toward the rake, thereby inclosing and holding between said fork and the rake that portion of the crop under which the rake has passed. A load of the crop being thus secured between the rake and fork is in readiness for being lifted from the ground and for being dumped. This closing-down operation of the lever and fork also causes a catch on the under side of the outer arm of said lever to engage with a frame projecting upward from the cross-bar of the rake, whereby the rake is retained in position to safely carry the load of hay or other crop resting upon it until the moment for dumping the load has arrived, at which moment this catch is released, as hereinafter described. So soon as the lever with its fork is lowered to inclose the portion or load of hay or other crop which has been gathered on the rake, the pulling by the third horse upon the rope-and-block tackle causes the parts which inclose the load or charge to be lifted upward angularly by moving around the universal joints to a sufficient height for dumping the load onto a cart or wagon, which is drawn up in position at the side of the machine to receive the load when dumped. In being so raised the angular position of that portion of the rope between the pulley on the jib and another pulley at the side of the main frame causes the parts carrying the load to move upward in a curved path, so that these parts, which at their normal and lowest position are situated at the front of the machine during the gathering of a load of hay or other crop, when raised upward—that is to say, during the raising action—move around at right angles to that normal position when lifted to the height necessary for the dumping operation. During the raising upward of these parts the roller-pulley gradually moves forward to the front end of its parallel guides, and when at the highest point the roller-pulley has moved so far forward in these guides as to transfer the tension of the rope to the outer or upper side of the pivot. This movement of the roller-pulley causes the lever with its fork to be raised or opened away from the rake. At the same time it lifts the retaining-catch from the frame of the rake, at which instant the weight of the load of hay or other crop upsets the rake on its hinges, so that the load simultaneously falls or is dumped into the carts or wagons drawn up to the side of the machine to receive the load. Instantaneously with the rake being thus relieved from the load it returns to its normal position on the arm by reason of the weight of that portion thereof on the rear of the hinge connection being greater than the weight of that portion in front of the hinge connection. So soon as the load is thus dumped the pulling of the third horse upon the rope-tackle is checked, and the rake with its connections are lowered to collect another load of the crop, the machine being then propelled forward by the pair of horses again pulling on the doubletree, as hereinafter set forth. The lowering of the rake and its connections takes place by the action of gravity, a brake being provided which is operated by the hand of the driver to allow the weight of the parts to unwind the rope-tackle, the driver controlling this action by means of said brake, so as to allow the lowering operation to take place gradually or without shock or any sudden action which might destroy or injure the parts.

Figure 1 is a side elevation of the machine for lifting and loading hay, grain, or other crops constructed according to my improvements. Fig. 2 is a plan thereof. Fig. 3 is another side elevation showing the crop collecting and dumping parts of the machine in the upraised position in readiness for dumping the load. Fig. 4 is an end elevation of the same machine with the dumping parts in position and corresponding to Fig. 3. Figs. 5, 6, 7, and 8 are enlarged views of certain parts or details of the mechanism for the purpose of showing these parts more clearly than upon the small scale to which they are drawn in Figs. 1 to 4.

The main frame A is supported near the middle of its length upon the wheels B, by which the machine is carried and rests upon the ground, the ground being indicated by the rough or uneven line C in Figs. 1, 3, and 4. The tongue or pole D is connected to the main frame A by means of a hinge-coupling at E. Near the outer end of the tongue or pole D the platform F is carried, and just below or near to the platform F the doubletree G is attached by a suitable pivoted connection. The horses by which the machine is propelled are harnessed to the doubletree G, and when so harnessed occupy the two spaces, one on either side of the tongue D, between the doubletree G and the main frame A. At the outer end of the tongue or pole D the steering-wheel H is carried in a swivel-holder I, to which a lever J is attached, which, when the driver stands upon the platform F, is situated between the driver's legs. By swaying his body to the right or left the driver exerts pressure on one or the other side of the lever J, and thus directs the position of the steering-wheel H to the course in which he desires the machine to travel over the ground.

Near the central part of the main frame A a lever K is connected, as shown in the drawings, and this lever extends rearward just above the tongue or pole D. The tongue or pole D carries an adjusting-quadrant L, with which the lever K is engaged by means of a pin placed in any one of the holes (shown at Fig. 1) in said quadrant and said lever. By raising or lowering the lever K the driver can alter, whenever required, the angular position of the machine with the ground C, the object of this lever K being more especially to vary the angle of the points of the teeth of the rake M relatively with the ground C.

Near the middle of the main frame A the mast N is situated, being rigidly attached to the main frame A. At the lower part of this mast N the arm O is connected by a universal joint P. At its outer end this arm O carries the rake M, which is attached to the arm by forked brackets Q, through holes in which and corresponding holes in the rake M the rod R passes, thereby making a pivot or swivel connection between the arm O and the rake M, so that the rake M is, when required, free to be turned through the requisite angle upon the rod R as a center or axis. Near the outer end of this arm O is rigidly attached the post S, and at the top of which the swing-lever T is carried upon a pivot U, so that the lever T may be moved in relation to the rake M from the position shown in full lines in Fig. 1 to the position shown in dotted lines in said figure. The lever T carries the fork V at its outer end.

Near the top of the mast N the jib W is connected by a swinging joint, so that the jib may be moved round from the position shown in Fig. 1 to a position at right angles thereto. The jib W carries a pulley-block X, through which a rope Y is passed, as shown in the drawings. This rope Y passes round the under side of the roller-pulley Z, also through the pulley a at one side of the main frame A, from which it is conducted onto the winding-barrel b. This barrel b is carried upon the shaft c, and at the other end of this shaft c is a grooved pulley d, on which is wound a portion of the wire cable or rope e, which extends rearward, as shown in the drawings, and to the outer end of which the third horse, hereinbefore referred to, is harnessed.

When the horses which are harnessed to the doubletree are driven forward, it will be understood that they propel the machine in advance of themselves, so that the rake M is forced in under the loose crop lying on the ground C. While thus propelling the machine the third horse, harnessed to the cable or rope e, is either turned round to walk in the direction in which the machine is propelled, or it may be disconnected from the cable or rope e, there being no pull or tension upon the cable or rope e at this time.

While the machine is being propelled forward, so as to gather a load of the crop upon the rake M, the swinging lever T, with its fork V, occupies the position shown in full lines at Fig. 1, and the catches, which are hereinafter fully described, that retain the roller-pulley Z in the position shown in full lines in Fig. 1, being released by means of the rods t coming in contact with the bar g, the tension on the rope Y starts the roller-pulley Z to move backward in its parallel paths or guides h to the position shown in the lower of the two sets of dotted lines marked n in Fig. 1. Into this position the roller-pulley Z easily passes, by virtue of the distance between the center of the roller-pulley Z and the center of the block X being less in the position shown dotted than it is in the position shown in full lines. As the drawing Fig. 1 is necessarily on a small scale, it is difficult to illustrate this difference of distance between the centers of the roller-pulley Z and the block X, and for this reason I have annexed the drawing Fig. 8, which is a diagram on a larger scale, showing more clearly the difference of these distances in the two extreme positions which the roller-pulley Z can occupy when at opposite ends of its parallel paths or guides h. On the front part of the main frame A a post i is fixed, which prevents the arm O and its connections from swaying or being moved round to the opposite side of the machine. A check-chain j connects the rake M to the post S, this chain being of such a length as to prevent the rake from tipping too far forward in the act of dumping a load of hay or other crop.

The machine has a curved guide k on that side to which the rake M and fork V are turned in the act of raising them prior to the dumping operation, and this guide k constitutes a path upon which the under side of the front part of the arm O rests in ascending to and descending from its highest position.

By reason of that part of the rope Y between the block X on the jib W and the block a on the main framing A being drawn taut at an angle, and by further reason of the jib W, together with the arm O, being movable round the joints by which they are connected to the mast N, the tension of the rope Y, during the operation of raising the load inclosed between the rake M and fork V, causes these parts with their load to be swung round to the side of the machine during the raising action, and resting as they do against or upon the curved path or guide k, the alteration in position of these parts from the front to the side of the machine, as shown in dotted lines in Figs. 1, 2, 3, and 4, takes place gradually and without sudden action or shock.

When the swinging lever T, with its fork

V, occupies the position shown in dotted lines at Fig. 1, the catch $l$, upon the front arm of the lever T, engages with the frame $m$, projecting upward from the back bar of the rake M, thereby locking the rake M and the fork V together, in which locked position they remain until these parts with their contained load of hay or other crop are raised upward to their highest point by the pull on the rope-tackle. When the highest point has been reached, as shown at Figs. 1, 3, and 4, then the roller-pulley Z has moved in its parallel paths or guides $h$ to a position above the pivot U, so that the tension of the rope Y, in this highest position, pulls the swinging lever T backward simultaneously with drawing the fork V from holding the load of hay or other crop upon the rake M and releasing the retaining-catch $l$ from the frame $m$, at which moment the weight of the load upon the rake causes it to turn upon the rod R, so that the load, being no longer supported, falls from the rake or is dumped into a cart or wagon placed below to receive it, immediately after which the rake M moves back to its normal position in relation to the arm O by reason of that portion of the rake situated on the inner side of the rod R being heavier than the other portion of the said rake on the outer side of said rod R.

The lever $o$ is for operating the brake-block $p$, and the lever $q$ is connected to a strap-brake encircling the brake-drum $r$ on the shaft $c$, by operating which the driver controls the descent of the rake M, fork V, and their connected parts during the return of these parts from their highest to their lowest position.

In the enlarged detail views, Figs. 5, 6, and 7, the stops $s$, which retain and release the roller-pulley Z from its locked position in the parallel guides or paths $h$, are shown. To these stops $s$ a tail-piece $t$ is attached and hangs downward, as shown. So long as this tail-piece $t$ is out of contact with the bar $g$ in the main frame A, the stops $s$ being in their lowest position and remaining therein by the action of gravity, lock the roller-pulley Z in the front end of the paths or guides $h$, and the tension of the rope Y maintains the fork V therefore in the open position, but the moment that the tail-piece $t$ comes in contact with and continues to rest on the bar $g$, then the further descent of the arm O and its connections causes the tail-piece $t$ to push the stops $s$ upward, thereby moving them out of contact with the axis of the roller-pulley Z, which is then free to move backward in its parallel paths or guides $h$. The tension of the rope Y, the moment that the release of the stops $s$ is effected, starts the pulley Z to move backward in its parallel guides, as hereinbefore described.

Having now fully described the nature of my said invention and the manner of carrying the same into practical effect, what I claim, and desire to secure by Letters Patent, is—

1. The combination in a machine for lifting and loading hay, grain, or other crops, of the rake M, its check chain $j$, the fork V, the swinging lever T, carrying the fork V, the roller pulley Z, the roller paths $h$, the stops $s$, the tail piece $t$, the bar $g$, the block and rope tackle, the frame $m$, the catch $l$, the post S, the arm Q, connected by a universal joint to the mast N, and all of these parts operating together in the manner and for the purposes substantially as set forth.

2. In a machine for lifting and loading hay, grain or other crops, the combination consisting of the rake M, pivotally supported upon the rake arm O, the lever T, pivoted to the standard or post S, of the rake arm O, the parallel paths $h$, carried upon the lever T, the roller pulley Z, moving in the roller paths $h$, the catch $l$, on the lever T, co-operating with the rake M, the rope tackle for catching the roller pulley Z, the fork V, carried upon the end of the lever T, all operating together for the purpose of moving the fork V, to and from the rake M, in the manner and for the purposes substantially as set forth.

3. In a machine for lifting and loading hay, grain or other crops, the combination consisting of the automatic stops $s$, the tail piece connected to said stops $s$, the bar $g$, for actuating the stops $s$, by contact therewith for the purpose of retaining and releasing the roller pulley Z, to enable it to move in the parallel paths $h$, at the proper times, in order to operate the fork V, relatively with the rake M, the said parts being mounted upon the post S, carried upon the rake arm O, all operating together in the manner and for the purposes substantially as set forth.

In testimony whereof I have hereunto set my signature in presence of two subscribing witnesses.

CHARLES FREEMAN.

Witnesses:
S. J. DAY,
CHAS. J. ELLIS.